Figure 1:
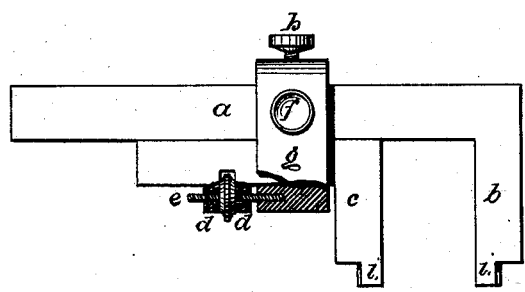
Figure 2:
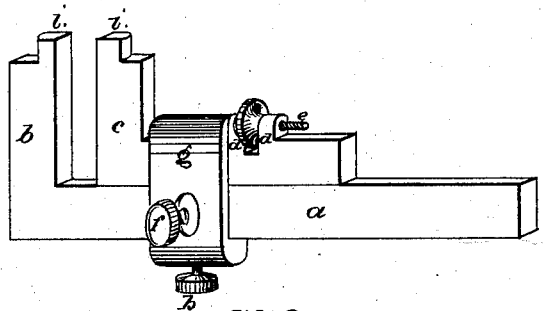

G. B. WELD.
Calibre-Gage.

No. 165,193.

Patented July 6, 1875.

WITNESSES.

J. A. Miller Jr.
Ernest E. Barth.

INVENTOR.

George B Weld
by Joseph A Miller
Attorney

UNITED STATES PATENT OFFICE.

GEORGE B. WELD, OF PROVIDENCE, RHODE ISLAND.

IMPROVEMENT IN CALIBER-GAGES.

Specification forming part of Letters Patent No. 165,193, dated July 6, 1875; application filed February 3, 1875.

*To all whom it may concern:*

Be it known that I, GEORGE B. WELD, of the city of Providence, State of Rhode Island, have invented a new and useful Improvement in Adjustable Caliber-Gages; and I do hereby declare that the following is a full, clear, and exact description thereof, which will enable others skilled in the art to make and use the same, reference being had to the accompanying drawings forming part of this specification.

Figure I is a view of my improved adjustable caliber-gage, the stirrup being shown partly cut away to allow the adjusting-screw to be seen. Fig. II is a perspective view of the same.

Similar letters of reference indicate corresponding parts.

In the drawings, $a$ is the fixed arm of my improved gage, having at one end the arm $b$. $c$ is the adjustable arm or slide. $g$ is the slotted stirrup, sliding freely on the arm $a$, but resting in a recess on the slide $c$, wider than the stirrup, so that the slide $c$ may be moved through a limited distance for accurate adjustment of the caliber-gage. $d\ d$ are two abutments formed on the sliding arm $c$, and through the same the screw $e$, secured to the stirrup $g$, passes. Between the abutments the thumb-nut can be turned in either direction on the screw $e$, and as the abutments prevent the thumb-nut from moving laterally on the screw, the relative position of the slide $c$ is changed in either direction. When the thumb-screw F is screwed against the arm $a$ the stirrup $g$ will be secured to the arm $a$, and the sliding arm $c$ may then be with the greatest accuracy adjusted by the nut on the screw $e$.

The thickness of any object may thus be accurately measured between the arms $b$ and $c$, while the accurate distance may be ascertained by inserting the projecting points $i\ i$ within or between the parts the interior diameter of which, or the distance they are apart, is to be ascertained; and when such measurement has been taken, the whole is permanently secured by tightening the screw $h$, thus allowing the gage once set to be used many times without the danger of any part changing its position.

I am aware that adjustable caliber-gages have heretofore been made in which the final adjustment was done by a screw. I do not broadly claim the adjusting-screw or thumb-piece as my invention. But the arrangement of the stirrup and the abutments $d\ d$ in reference to the sliding arm $c$, as also the facility for securing the stirrup first for final adjustment, and then to permanently retain such adjustment, are such as make my improved adjustable caliber-gage a more desirable instrument than those heretofore made. By my improvement in using only one stirrup a gage of the same length as those now made, instead of being limited to measuring one and a quarter inch, two and three-eighths inches can be measured by my gage of the same length.

Having thus described my invention, I claim as new, and desire to secure by Letters Patent as my invention—

1. The combination of the stirrup $g$, having the clamp-screws F and $h$, the screw $e$, fixed to the stirrup, and carrying the adjusting-nut screwed between the abutments $d\ d$ of the arm $c$, when used for final adjustment of a gage, substantially as and for the purpose herein set forth.

2. A caliber-gage consisting of the fixed arm $a\ b$, the sliding arm $c$, provided with the abutments $d\ d$, the stirrup $g$, having the thumb-screws $f$ and $h$ for securing the stirrup to the arm $a$, and the screw $e$, secured to the stirrup and carrying the adjusting-nut, when operating together substantially as and for the purpose herein described.

GEORGE B. WELD.

Witnesses:
JOSEPH A. MILLER,
JAMES C. RICHARDSON.